(12) United States Patent
Armesto-Beyer et al.

(10) Patent No.: US 11,713,823 B2
(45) Date of Patent: Aug. 1, 2023

(54) VALVE FOR A FLUID

(71) Applicant: TRUMA GERÄTETECHNIK GmbH & CO. KG, Putzbrunn (DE)

(72) Inventors: Kai Armesto-Beyer, Putzbrunn (DE); Michael Weber, Putzbrunn (DE)

(73) Assignee: TRUMA GERÄTETECHNIK GmbH & CO. KG, Putzbrunn (DE)

( * ) Notice: Subject to any disclaimer, the term of this patent is extended or adjusted under 35 U.S.C. 154(b) by 10 days.

(21) Appl. No.: 17/596,159

(22) PCT Filed: Jun. 9, 2020

(86) PCT No.: PCT/EP2020/000113
§ 371 (c)(1),
(2) Date: Dec. 3, 2021

(87) PCT Pub. No.: WO2020/249253
PCT Pub. Date: Dec. 17, 2020

(65) Prior Publication Data
US 2022/0252171 A1  Aug. 11, 2022

(30) Foreign Application Priority Data
Jun. 12, 2019  (DE) .................... 10 2019 004 098.8

(51) Int. Cl.
*F16K 31/00* (2006.01)
*F16K 17/04* (2006.01)
(Continued)

(52) U.S. Cl.
CPC .......... *F16K 17/042* (2013.01); *F16K 31/003* (2013.01); *F16K 31/084* (2013.01);
(Continued)

(58) Field of Classification Search
CPC .. F16K 31/003; F16K 31/086; F16K 31/1262; F16K 31/1266; F16K 17/042; F16K 17/0433
See application file for complete search history.

(56) References Cited

U.S. PATENT DOCUMENTS 1,212,951 A * 1/1917 Higinbotham ...... F16K 17/0433
137/509
1,636,769 A * 7/1927 Forman .................. B61D 19/02
251/61.3
(Continued)

FOREIGN PATENT DOCUMENTS

DE         2051401 A1    4/1972
DE        19626323 A1    1/1998
(Continued)

*Primary Examiner* — Umashankar Venkatesan
(74) *Attorney, Agent, or Firm* — McNees Wallace & Nurick LLC

(57) ABSTRACT

Example embodiments disclose a valve seat that encloses a fluid passage for passage of a fluid from a fluid chamber, and a holding element that exerts a holding force on a valve body, the holding force acting in a direction towards a valve seat. In the event that the fluid acts on an effective surface of the valve body with a force or a pressure above a limit value, the valve body moves away from the valve seat. In the event that the fluid acts on an effective surface of the holding element with a force or a pressure above a limit value, the holding force acting on the valve body decreases. In doing so, the fluid acts on the holding element more strongly and/or earlier than on the valve body.

9 Claims, 2 Drawing Sheets

(51) Int. Cl.
*F16K 31/08* (2006.01)
*F16K 31/126* (2006.01)

(52) U.S. Cl.
CPC ........ *F16K 31/086* (2013.01); *F16K 31/1262* (2013.01); *F16K 31/1266* (2013.01)

(56) References Cited

U.S. PATENT DOCUMENTS

| | | | | |
|---|---|---|---|---|
| 2,189,750 | A * | 2/1940 | Barge | G01F 15/02 |
| | | | | 73/199 |
| 2,745,431 | A | 5/1956 | Jensen | |
| 4,469,124 | A * | 9/1984 | Bronsky | F16K 31/1262 |
| | | | | 251/61.3 |
| 5,501,425 | A * | 3/1996 | Reinicke | F16K 31/003 |
| | | | | 251/129.01 |
| 10,400,906 | B2 * | 9/2019 | Shirey | F16K 31/007 |
| 10,801,632 | B2 * | 10/2020 | Zuercher | F16K 17/196 |
| 11,148,818 | B2 * | 10/2021 | Morales | F04F 5/46 |
| 11,279,607 | B2 * | 3/2022 | Newton | F16K 31/086 |
| 11,473,682 | B2 * | 10/2022 | Yoshino | F16K 7/17 |
| 2004/0004199 | A1 * | 1/2004 | Igarashi | F16K 31/1221 |
| | | | | 251/63.5 |
| 2007/0221273 | A1 * | 9/2007 | Landers | F16K 31/365 |
| | | | | 137/510 |
| 2016/0178069 | A1 * | 6/2016 | Cler | G05D 16/2066 |
| | | | | 137/565.11 |

FOREIGN PATENT DOCUMENTS

| | | |
|---|---|---|
| DE | 102012004845 A1 | 9/2013 |
| DE | 102015009315 A1 | 1/2017 |

* cited by examiner

VALVE FOR A FLUID

FIELD OF THE DISCLOSURE

The invention relates to a valve for a fluid. The fluid is, for example, a liquid, e.g. water, or a gas.

BACKGROUND

In the prior art, valves are known that serve as pressure relief or drain valves by opening a separate drain outlet for the fluid in the event of an overpressure of the fluid.

To ensure rapid opening and closing of such a valve in the event of an overpressure, in DE 2 051 401 A1 a permanent magnet transfers a valve body to a rest position, in which a fluid passage is closed to the fluid.

The object on which the invention is based is to propose a valve for a fluid which distinguishes itself by an abrupt opening and closing behavior. Furthermore, a response behavior is preferably also provided that is reproducible as well as possible and preferably permanently stable.

SUMMARY

The invention achieves the object by means of a valve for a fluid, including a valve body and a valve seat, a fluid chamber for receiving the fluid, and a holding element, wherein the valve seat encloses a fluid passage for passage of the fluid out of the fluid chamber, wherein the valve body and the holding element are in operative connection with the fluid received in the fluid chamber, wherein the holding element exerts a holding force on the valve body, the holding force acting in a direction towards the valve seat, wherein an effective surface facing the fluid chamber is associated with the valve body, wherein in the event that the fluid received in the fluid chamber acts on the effective surface of the valve body with a force or a pressure above a limit value predefined for the valve body, the valve body moves away from the valve seat, wherein an effective surface facing the fluid chamber is associated with the holding element, wherein in the event that the fluid received in the fluid chamber acts on the effective surface of the holding element with a force or a pressure above a limit value predefined for the holding element, the holding force acting on the valve body decreases, and wherein the valve body and/or the holding element is/are configured and/or arranged such that the fluid received in the fluid chamber acts on the holding element more strongly and/or earlier than on the valve body.

The fluid flowing in therefore has an effect on the valve body and on a holding element. The particular effect consists in that the impact on the holding element is stronger—or, worded alternatively: intensified—and/or takes place earlier than with respect to the valve body. As a result, the effect of the fluid starts first and/or more strongly with the holding force, and it is only later and/or with a delay that the fluid passage is opened for the flow of the fluid—caused by the movement of the valve body. An abrupt opening and closing behavior can thus be realized by the choice and design of the mechanism and/or the interaction.

One configuration consists in that the limit value predefined for the valve body is higher than the limit value predefined for the holding element. Thus, in this configuration, a higher pressure or force is required for the valve body to move than for reducing the holding force. Here, the ratio between the limit values relative to each other is either constant in time or variable. The variability results, for example, in that at least one limit value is variable.

One configuration provides that the limit value predefined for the valve body and/or the limit value predefined for the holding element is/are variable. In this configuration, it is not a matter of two—in particular temporally—fixed limit values, but at least one limit value can change. The change in the limit value is for example a step during the reaction of the valve to an overpressure in the fluid. This is therefore a purposeful change of the limit value. This is in contrast to a change in a limit value that appears, for example, due to aging effects.

One configuration consists in that the limit value predefined for the valve body is dependent on the holding force acting on the valve body. For example, in one configuration, reducing the holding force has the effect that a lower pressure is sufficient to cause the valve body to move out of the valve seat. This is thus an exemplary configuration of a time-variable limit value.

One configuration makes provision that the effective surface of the valve body is smaller than the effective surface of the holding element. The smaller the effective surface, the lower the transmission of force or pressure of the fluid to the valve body or the holding element. Therefore, the same fluid also has a stronger or faster effect on the holding element than on the valve body.

One configuration consists in that the effective surface of the valve body and/or the effective surface of the holding element is/are variable. By having at least one effective surface that is variable, the degree of force transmission of the fluid to the associated component (i.e., valve body or holding element) also changes.

One configuration provides that an extension of the effective surface of the valve body is dependent on the holding force acting on the valve body. Thus, this is a configuration in which the effective surface of the valve body is variable. Preferably, here the extension (alternative designations: extent or dimension) of the effective surface (that is, the effective active surface) increases as the holding force decreases.

One configuration consists in that in the event that the holding force acting on the valve body decreases, the holding element exposes at least a portion of the effective surface of the valve body for an action of the fluid.

One configuration provides that the valve body and the holding element are configured and arranged such that the valve body and the holding element move in different directions under the action of the fluid, and that the holding force decreases in the event that a distance between the holding element and the valve body increases. Preferably, the valve body and the holding element are configured and arranged so as to be movable in the valve. Preferably, in one configuration, the holding force is dependent on the distance between the holding element and the valve body.

In one configuration, the valve body and the holding element are in—preferably direct—contact with each other at maximum holding force. In a further configuration, part of the effective surface of the valve body is covered by the holding element due to the contact between the two.

One configuration provides that a magnetic attraction force acts between the holding element and the valve body. A magnetic attraction force is produced, for example, in that a magnet is incorporated in one of the components (holding element or valve body) and the other component is, e.g., at least partially ferromagnetic. The selection of a magnet also allows, for example, the pressure to be defined as of which the valve opens the drain outlet for the pressure drop.

One configuration consists in that the valve body and/or the holding element is/are at least partly arranged within the fluid chamber and/or form(s) part of the fluid chamber. In this configuration, there is a direct contact of the fluid with the valve body and/or the holding element.

In one configuration, the fluid chamber and the fluid passage connect an inlet of the valve to a drain outlet. The drain outlet (an alternative designation is, e.g., overpressure outlet) exists here in addition to the outlet proper of the valve, through which the fluid leaves the valve in the normal case.

In detail, there are a multitude of possibilities for designing and further developing the valve according to the invention. In this regard, reference is made, for one thing, to the claims dependent on the independent claim, and, for another, to the following description of exemplary embodiments in conjunction with the drawings, in which:

DETAILED DESCRIPTION OF EXAMPLE EMBODIMENTS

Figure 1:
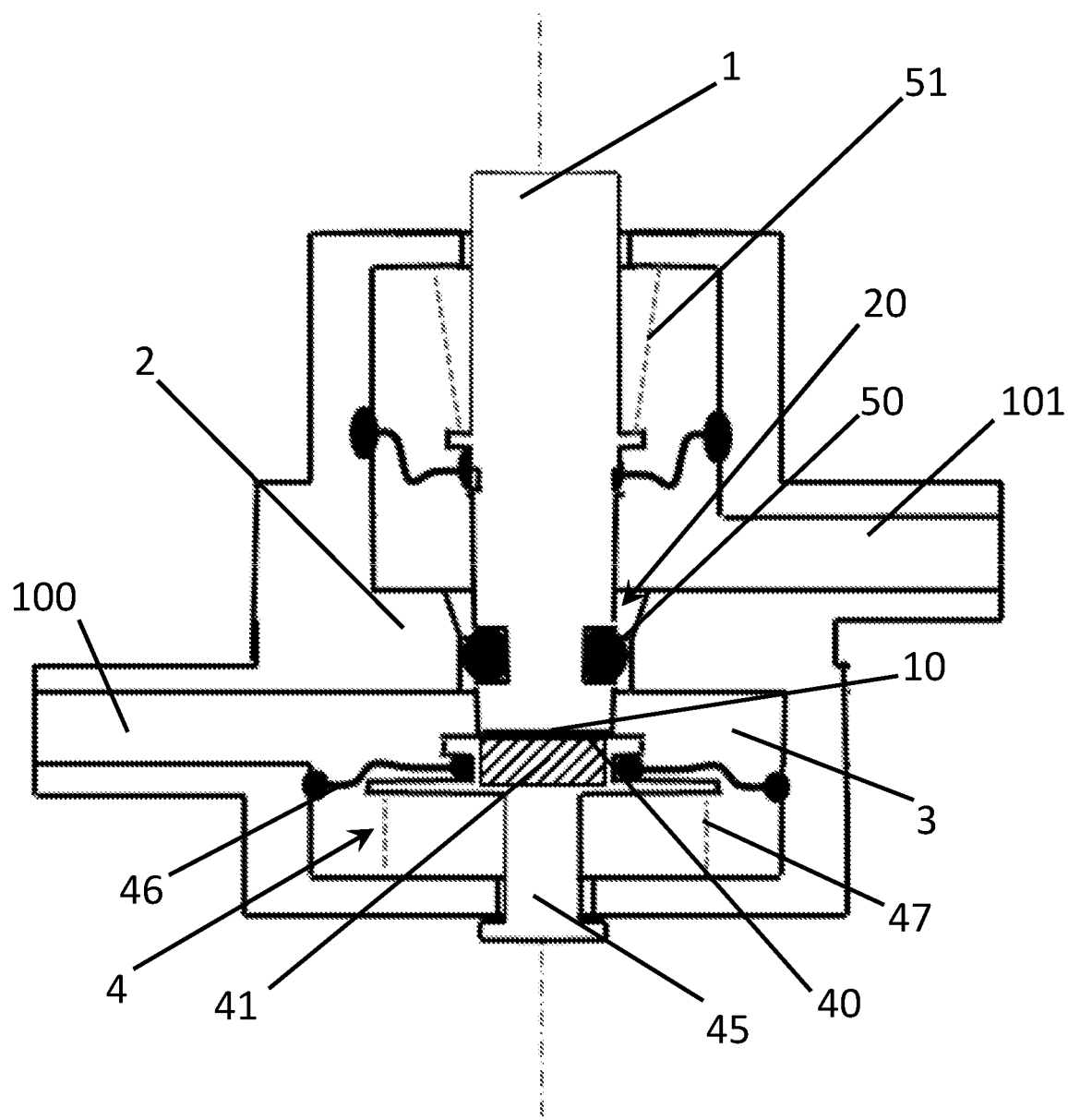
FIG. 1 shows a schematic illustration of the valve in the rest position with the fluid passage closed.

FIG. 1 shows a section taken through a valve according to the invention.

Here, the (normal) condition is shown, in which the overpressure or drain outlet 101 is not open. The fluid is thus under a permissible pressure. In this condition, the fluid flows from the inlet 100 through the fluid chamber 3 to the standard fluid outlet—not illustrated here. In case of an overpressure, the fluid moves out of the fluid chamber 3 via the fluid passage 20 to the drain outlet 101—in accordance with the function of the valve.

The fluid passage 20 is encompassed by the fluid seat 2 and, in the state shown here, is closed by the valve body 1 in cooperation with a sealing element 50. In the configuration illustrated, the fluid passage 20 conically widens towards the drain outlet 101, whereby closing of the valve is to be facilitated. The sealing element 50 is located in a circumferential groove of the valve body 1 and is thereby moved along during a movement of the valve body 1.

The valve body 1 is pulled toward the valve seat 20 by a holding element 4. To this end, a magnet 41 as part of the holding element 4 exerts a magnetic attraction force as a holding force on the at least partly ferromagnetic valve body 1. Furthermore, a spring element 51 exerts a force on the valve body 1 toward the valve seat 20.

The holding element 4 has a plunger 45, in the face side of which—in the variant illustrated—the magnet 41 is located, and a diaphragm 46, which here forms part of the wall of the fluid chamber 3. The diaphragm 46 and the plunger 45 here are designed and coupled to each other in such a way that a movement of the diaphragm 46 has an effect on the plunger 45. In particular, the plunger 45 is moved in the axial direction. Here, a restoring spring element 47 acts on the plunger 45 and thereby counter to the direction of force of the fluid.

In the configuration shown, the face sides of the plunger 45 and of the valve body 1 are located within the fluid chamber 3 and therefore within the fluid as well. The end faces of the plunger 45 and of the valve body 1 are each realized to be so planar and parallel with respect to each other that in the normal state as illustrated, they rest directly upon each other—and in particular free of the fluid between them.

The resting results in that the effective surface 10, which is associated with the valve body 1 and against which the fluid in the fluid chamber 3 can press, is small in the normal state. The effective surface 10 is given here in particular only by the narrow gap between the face side of the valve body 1 and the inside diameter of the fluid passage 20 and thus, in the illustrated example, only by the sealing element 50. The holding element 4, in contrast, has a significantly larger effective surface 40, given by the face side of the plunger 45 and also by the diaphragm 46, which is mechanically coupled to the plunger 45. This means that the fluid has a stronger and/or earlier effect with respect to the holding element 4 than with respect to the valve body 1.

The valve body 1 and the holding element 4 are configured and arranged in the valve in such a way that they can each be moved in one respective direction of movement by the fluid. In the variant illustrated, the directions of movement of the holding element 4 and the valve body 1 extend opposite to each other along a common axis. This axis here is also the axis of symmetry of the holding element 4 and the valve body 1, which are rotationally symmetrical components.

Because of the magnetic holding force acting between the holding element 4 and the valve body 1, the holding element 4 does not move until a limit value specified for the holding element 4 has been exceeded by the fluid.

When the holding element 4 and the valve body 1 disengage from each other, a further part of the effective surface 10 of the valve body 1 is exposed so that the fluid can act more strongly against the valve body 1—upward in the drawing here—and thus push it out of the valve seat 2. In addition, as the distance between the valve body 1 and the holding element 4 increases, the holding force of the holding element 4 on the valve body 1 decreases. As a result, the limit value associated with the valve body 1 decreases; when it is exceeded, the valve body 1 can move out of the normal or closed position and can open the fluid passage 20.

An abrupt opening of the valve is thus effected in total by the extent of the effective surface 10 of the valve body 1, which is dependent on the interaction with the holding element 4, and by the distance dependence of the magnetic force as a holding force.

Figure 2:
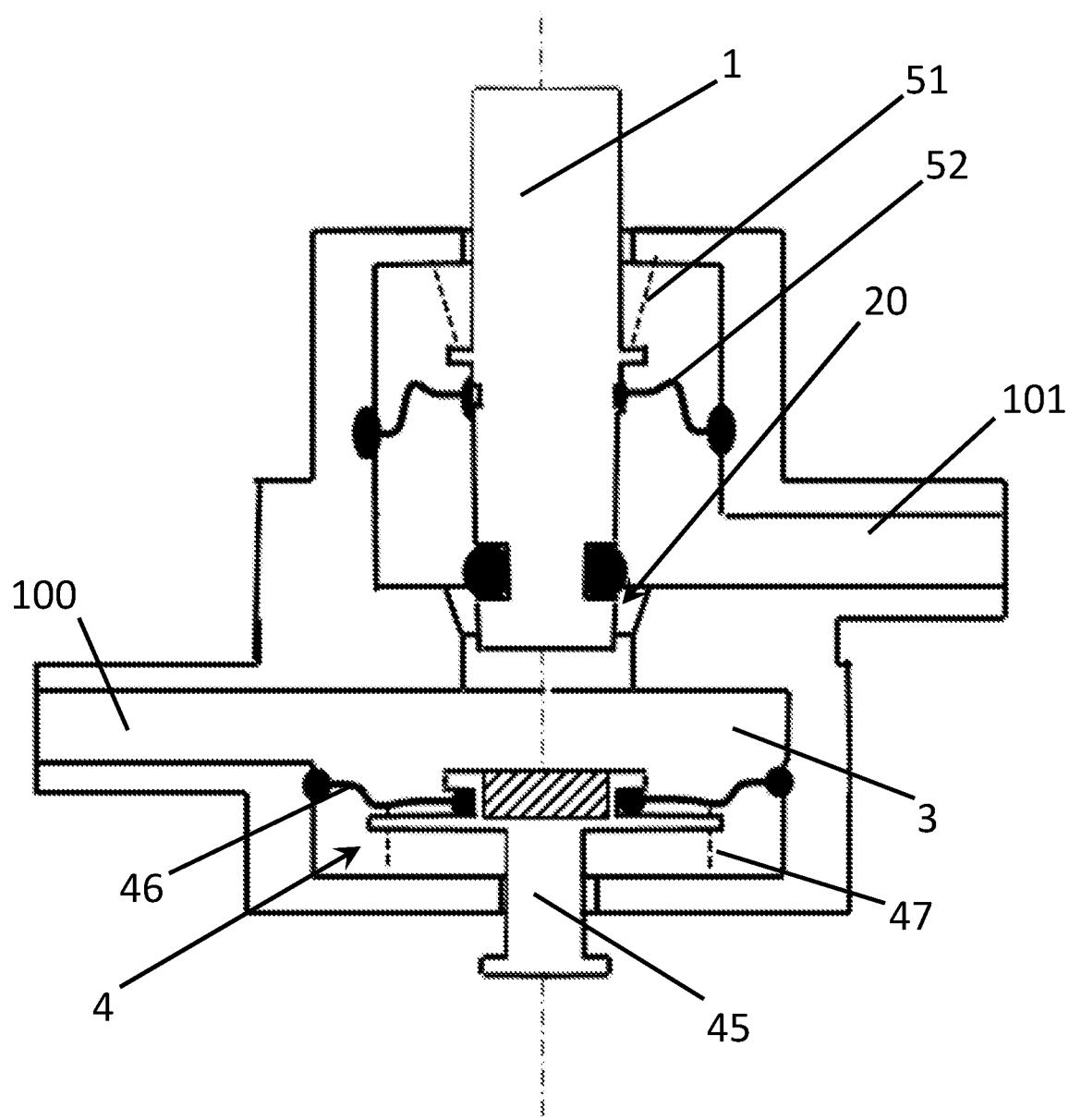
FIG. 2 shows the valve of FIG. 1 with the fluid passage open.

The state of the open valve during the draining of the fluid and thus the reduction in overpressure is shown in FIG. 2.

The fluid flows from the inlet 100 through the fluid chamber 3 and the fluid passage 20 to the drain outlet 101, with the diaphragm 46 and the plunger 45 being pressed against the spring element 47—downward in the drawing here. Since the diaphragm 46 and the plunger 45 arranged centrally in it form part of the wall of the fluid chamber 3 here, the volume thereof thus also increases.

In addition, the fluid presses the valve body 1 upward contrary to the spring element 51 protected by an elastomer seal 52.

When the pressure of the fluid has dropped sufficiently, the valve body 1 is moved back into the valve seat 2 by the spring element 51 associated with it. At the same time, the diaphragm 46 returns to its initial condition and the plunger 45 is pushed upward by the spring element 47 associated with it.

These two movements, which are generated by the spring elements 51, 47, also cause the valve body 1 and the holding element 4 to approach each other such that the holding force acts between them and a contact occurs between the contact surfaces.

In the configuration as illustrated, the planar end faces ensure that the fluid between the valve body 1 and the holding element 4 is displaced. In an alternative variant (not shown), a shaped sealing body is provided which effects displacement of the fluid. Alternatively, sealing lips are provided, for example, which provide for a kind of suction cup effect.

When the end faces touch, the fluid passage 20 is closed again and the fluid flows again from the inlet 100 to the normal outlet (not shown here).

LIST OF REFERENCE NUMBERS 1 valve body
2 valve seat
3 fluid chamber
4 holding element
10 effective surface
20 fluid passage
40 effective surface
41 magnet
45 plunger
46 diaphragm
47 spring element
50 sealing element
51 spring element
52 seal
100 inlet
101 drain outlet

The invention claimed is:

1. A valve for a fluid, comprising
a valve body and a valve seat;
a fluid chamber for receiving the fluid; and
a holding element,
wherein the valve seat encloses a fluid passage for passage of the fluid out of the fluid chamber,
wherein the valve body and the holding element are in operative connection with the fluid received in the fluid chamber,
wherein the holding element exerts a holding force on the valve body, the holding force acting in a direction towards the valve seat,
wherein an effective surface facing the fluid chamber is associated with the valve body,
wherein in the event that the fluid received in the fluid chamber acts on the effective surface of the valve body with a force or a pressure above a limit value predefined for the valve body, the valve body moves away from the valve seat,
wherein an effective surface facing the fluid chamber is associated with the holding element,
wherein in the event that the fluid received in the fluid chamber acts on the effective surface of the holding element with a force or a pressure above a limit value predefined for the holding element, the holding force acting on the valve body decreases,
wherein the valve body and/or the holding element is/are configured and/or arranged such that the fluid received in the fluid chamber acts on the holding element more strongly and/or earlier than on the valve body,
wherein the valve body and the holding element are configured and arranged such that the valve body and the holding element move in different directions under the action of the fluid,
wherein the holding force decreases in the event that a distance between the holding element and the valve body increases,
wherein a magnetic attraction force acts between the holding element and the valve body, and
wherein the valve body and the holding element are configured and arranged such that reducing the holding force has the effect that a lower pressure is sufficient to cause the valve body to move out of the valve seat.

2. The valve according to claim 1, wherein the limit value predefined for the valve body is higher than the limit value predefined for the holding element.

3. The valve according to claim 1, wherein the limit value predefined for the valve body and/or the limit value predefined for the holding element is/are variable, and
wherein the limit value predefined for the valve body is dependent on the holding force acting on the valve body.

4. The valve according to claim 1, wherein the effective surface of the valve body is smaller than the effective surface of the holding element.

5. The valve according to claim 1, wherein the effective surface of the valve body and/or the effective surface of the holding element is/are variable, and
wherein an extension of the effective surface of the valve body is dependent on the holding force acting on the valve body.

6. The valve according to claim 5, wherein in the event that the holding force acting on the valve body decreases, the holding element exposes at least a portion of the effective surface of the valve body for an action of the fluid.

7. The valve according to claim 1, wherein the valve body and/or the holding element is/are at least partly arranged in, and/or form(s) part of, the fluid chamber.

8. A valve for a fluid, comprising
a valve body and a valve seat;
a fluid chamber for receiving the fluid; and
a holding element,
wherein the valve seat encloses a fluid passage for passage of the fluid out of the fluid chamber,
wherein the valve body and the holding element are in operative connection with the fluid received in the fluid chamber,
wherein the holding element exerts a holding force on the valve body, the holding force acting in a direction towards the valve seat,
wherein an effective surface facing the fluid chamber is associated with the valve body,
wherein in the event that the fluid received in the fluid chamber acts on the effective surface of the valve body with a force or a pressure above a limit value predefined for the valve body, the valve body moves away from the valve seat,
wherein an effective surface facing the fluid chamber is associated with the holding element,
wherein in the event that the fluid received in the fluid chamber acts on the effective surface of the holding element with a force or a pressure above a limit value predefined for the holding element, the holding force acting on the valve body decreases,
wherein the valve body and/or the holding element is/are configured and/or arranged such that the fluid received in the fluid chamber acts on the holding element more strongly and/or earlier than on the valve body, and
wherein the holding force is an attraction force.

9. A valve for a fluid, comprising
a valve body and a valve seat;

a fluid chamber for receiving the fluid; and
a holding element,
wherein the valve seat encloses a fluid passage for passage of the fluid out of the fluid chamber,
wherein the valve body and the holding element are in operative connection with the fluid received in the fluid chamber,
wherein the holding element exerts a holding force on the valve body, the holding force acting in a direction towards the valve seat,
wherein an effective surface facing the fluid chamber is associated with the valve body,
wherein in the event that the fluid received in the fluid chamber acts on the effective surface of the valve body with a force or a pressure above a limit value predefined for the valve body, the valve body moves away from the valve seat,
wherein an effective surface facing the fluid chamber is associated with the holding element,
wherein in the event that the fluid received in the fluid chamber acts on the effective surface of the holding element with a force or a pressure above a limit value predefined for the holding element, the holding force acting on the valve body decreases,
wherein the valve body and/or the holding element is/are configured and/or arranged such that the fluid received in the fluid chamber acts on the holding element more strongly and/or earlier than on the valve body, and
wherein a magnetic attraction force acts between the holding element and the valve body.

* * * * *